United States Patent
Sato et al.

[11] Patent Number: 5,995,249
[45] Date of Patent: Nov. 30, 1999

[54] IMAGE SENSING DEVICE AND IMAGE READING APPARATUS USING THE SAME THAT REDUCES THE INFLUENCE OF COLOR MIXTURE DUE TO INTRAPIXEL TRANSFER

[75] Inventors: Hiroshi Sato, Kawasaki; Kazuhito Ohashi; Takashi Kawai, both of Yokohama, all of Japan

[73] Assignee: Canon Kabushiki Kaisha, Tokyo, Japan

[21] Appl. No.: 08/902,828

[22] Filed: Jul. 30, 1997

Related U.S. Application Data

[63] Continuation of application No. 08/511,977, Aug. 7, 1995, abandoned.

[30] Foreign Application Priority Data

Aug. 22, 1994 [JP] Japan .................................. 6-197075
Sep. 9, 1994 [JP] Japan .................................. 6-187157

[51] Int. Cl.[6] ........................... H04N 1/028; H04N 1/03; H04N 1/48
[52] U.S. Cl. .......................................................... 358/514
[58] Field of Search ................................... 358/514, 283, 358/282, 513, 505; 348/272, 282, 283, 262, 266; 250/208.1

[56] References Cited

U.S. PATENT DOCUMENTS 5,241,377  8/1993  Kaneda .................................. 348/265

FOREIGN PATENT DOCUMENTS

A-0281172  9/1988  European Pat. Off. .

OTHER PUBLICATIONS

European Search Report in corresponding foreign application EP95 30 5351 which cites the references disclosed in this Form PTO–1449.

*Primary Examiner*—Scott Rogers
*Attorney, Agent, or Firm*—Morgan & Finnegan LLP

[57] ABSTRACT

An image reading apparatus, having RGB photoreceptors comprising a CCD line sensor, reduces influence of color mixture due to intrapixel transfer in which electric charges from a photoreceptor are transferred via another photoreceptor. The RGB photoreceptors are provided close to each other in parallel, between CCD shift units corresponding to the photoreceptors. The electric charges generated at the G photoreceptor and the B photoreceptor are directly transferred to the CCD shift units. The electric charges generated at the R photoreceptor are transferred to the CCD shift units via the B photoreceptor. That is, the electric charges generated at a photoreceptor having a larger electric charge-generating characteristic are transferred via a photoreceptor having a smaller electric charge-generating characteristic. Further, a transfer direction in which the electric charges are transferred and a subscanning direction in which an original is conveyed upon reading by the photoreceptors are in the same direction. Thus the amount of color mixture can be reduced.

40 Claims, 10 Drawing Sheets

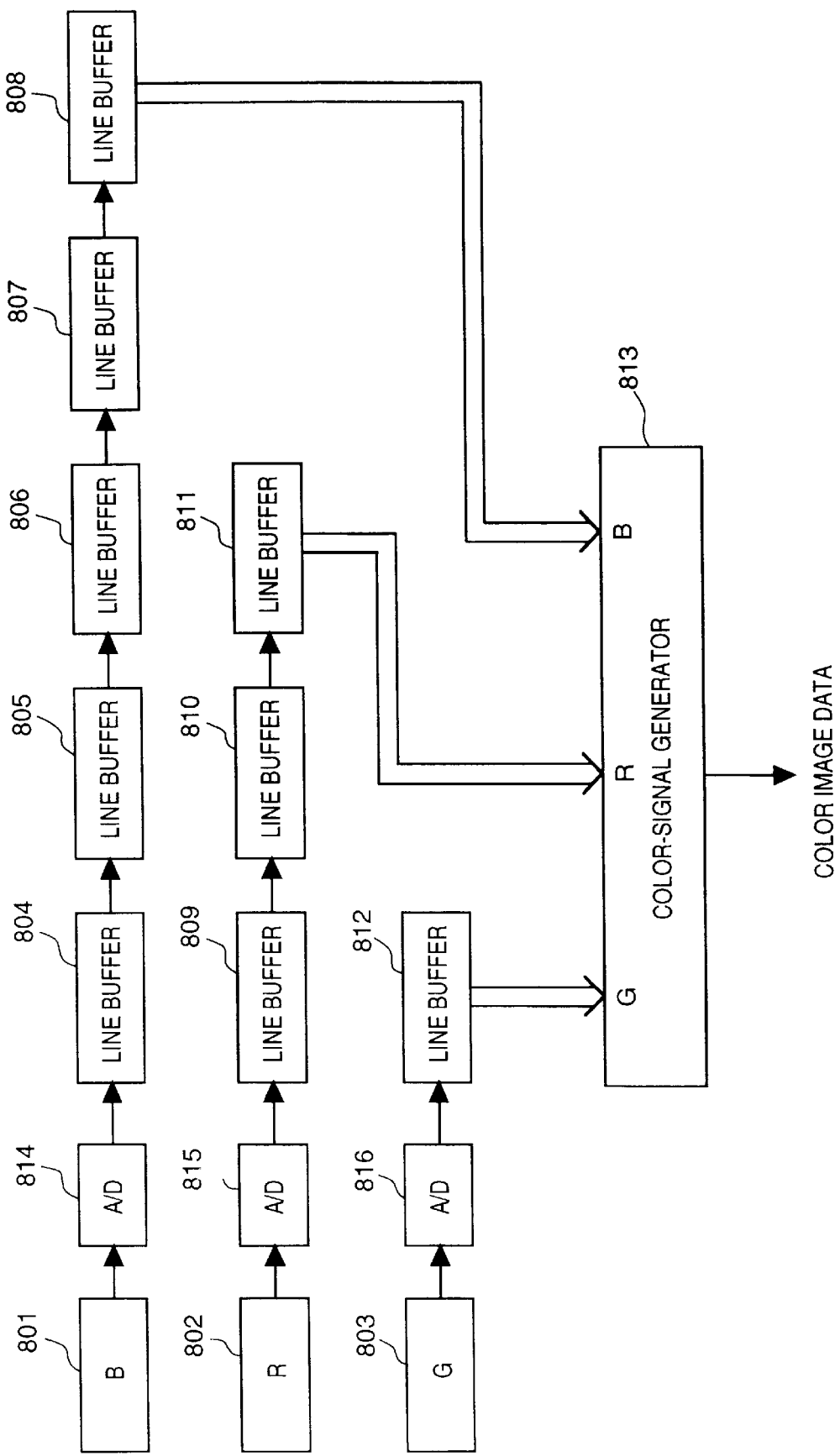

IMAGE SENSING DEVICE AND IMAGE READING APPARATUS USING THE SAME THAT REDUCES THE INFLUENCE OF COLOR MIXTURE DUE TO INTRAPIXEL TRANSFER

This application is a continuation of U.S. patent application Ser. No. 08/511,977, filed Aug. 7, 1995, now abandoned.

BACKGROUND OF THE INVENTION

Present invention relates to an image sensing device using e.g. a CCD sensor and an image reading apparatus using the image sensing device.

FIG. 3 shows the construction of a conventional CCD linear image sensor 201 used in a conventional color image reading apparatus.

In FIG. 3, reference numerals 301 to 303 denote photoreceptors having R, G and B color filters. The photoreceptors 301 to 303 have diodes for converting a light quantum into electric charges for each pixel. The electric charges generated by photoreception for a predetermined period are respectively transferred to CCD shift units 304, 306 and 308 for odd-numbered pixels and CCD shift units 305, 307 and 309 for even-numbered pixels. While the CCD photoreceptors 301 to 303 perform photoreception for the next line and accumulating the received light quanta, the electric charges transferred to the CCD shift units 304 to 309 are sequentially shifted in a fixed direction within the shift units, and converted into electric signals by amplifiers 310 and to 316 and outputted.

As shown in FIG. 3, in the conventional color linear image sensor, the CCD shift units for shifting electric charges from the R, G and B photoreceptors in a fixed direction are provided between the R and G photoreceptors and between the G and B photoreceptors. For this arrangement, the spacing between the R and G photoreceptors and that between the G and B photoreceptors must be wide.

In a case where signal processing such as masking calculation is performed on R, G and B signals read by this CCD sensor, corrections of difference among respective RGB reading positions are required. As spacing between the R and G photoreceptors and that between the G and B photoreceptors become wider, necessary memory capacity becomes large.

Considering the above drawback, a recent proposal is a construction where the photoreceptors are not alternatively provided with the CCD shift units, but photoreceptors are provided, as a set of photoreceptors, between CCD shift units. In this arrangement, the spacing among the R, G and B photoreceptors can be smaller than that in a conventional CCD sensor, and memory capacity for correcting difference among respective RGB reading positions can be reduced.

However, in this arrangement, at least one photoreceptors transfers electric charges to its corresponding CCD shift unit via another photoreceptor (pixel) that receives light of another color. This is called "intrapixel transfer". In this case, while the electric charges pass through the relay photoreceptor, the photoreceptor is exposed to light. As a result, a slight amount of color mixture occurs due to electric charges generated at the relay photoreceptor.

SUMMARY OF THE INVENTION

The present invention has been made in consideration of the above situations, and has as its object to provide an image sensing device where photoreceptor for one color and shift unit for the same color are provided close to each other.

It is another object of the present invention to provide an image sensing device where photoreceptors are provided close to each other, and shift units are also provided close to each other, to reduce memory capacity for correcting a difference among reading positions of respective colors, and an image reading apparatus using the image sensing device.

It is another object of the present invention to provide an image sensing device where a set of photoreceptors are provided between a plurality of shift units, to reduce color mixture upon intrapixel transfer, i.e., transferring electric charges accumulated at a photoreceptor via another photoreceptor for another color, to a minimum amount, and an image reading apparatus using the image sensing device.

It is another object of the present invention to provide an image sensing device where a photoreceptor that transfers electric charges via another photoreceptor has a maximum electric charge-generating amount, while a photoreceptor that passes the electric charges has a minimum electric charge-generating amount, to reduce color mixture amount, and an image reading apparatus using the image sensing device.

It is another object of the present invention to provide an image sensing device which has a linear image sensor where photoreceptors are alternately arranged with shift units and which can reduce color mixture amount, and an image reading apparatus using the image sensing device.

It is another object of the present invention to provide an image sensing device which performs intrapixel transfer of electric charges accumulated at a photoreceptor via another photoreceptor for another color, a transfer direction in which electric charges are transferred and a subscanning direction in which an image is scanned by a liner image sensor are in the same direction, so as to set image information positions where color mixture occur close to each other, to suppress degradation of image quality by influence of color mixture, and an image reading apparatus using the image sensing device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a block diagram showing the construction of a color image data generator of an image reading apparatus according to the second embodiment.

DETAILED DESCRIPTION OF THE PREFERRED EMBODIMENT(S)

Figure 1:
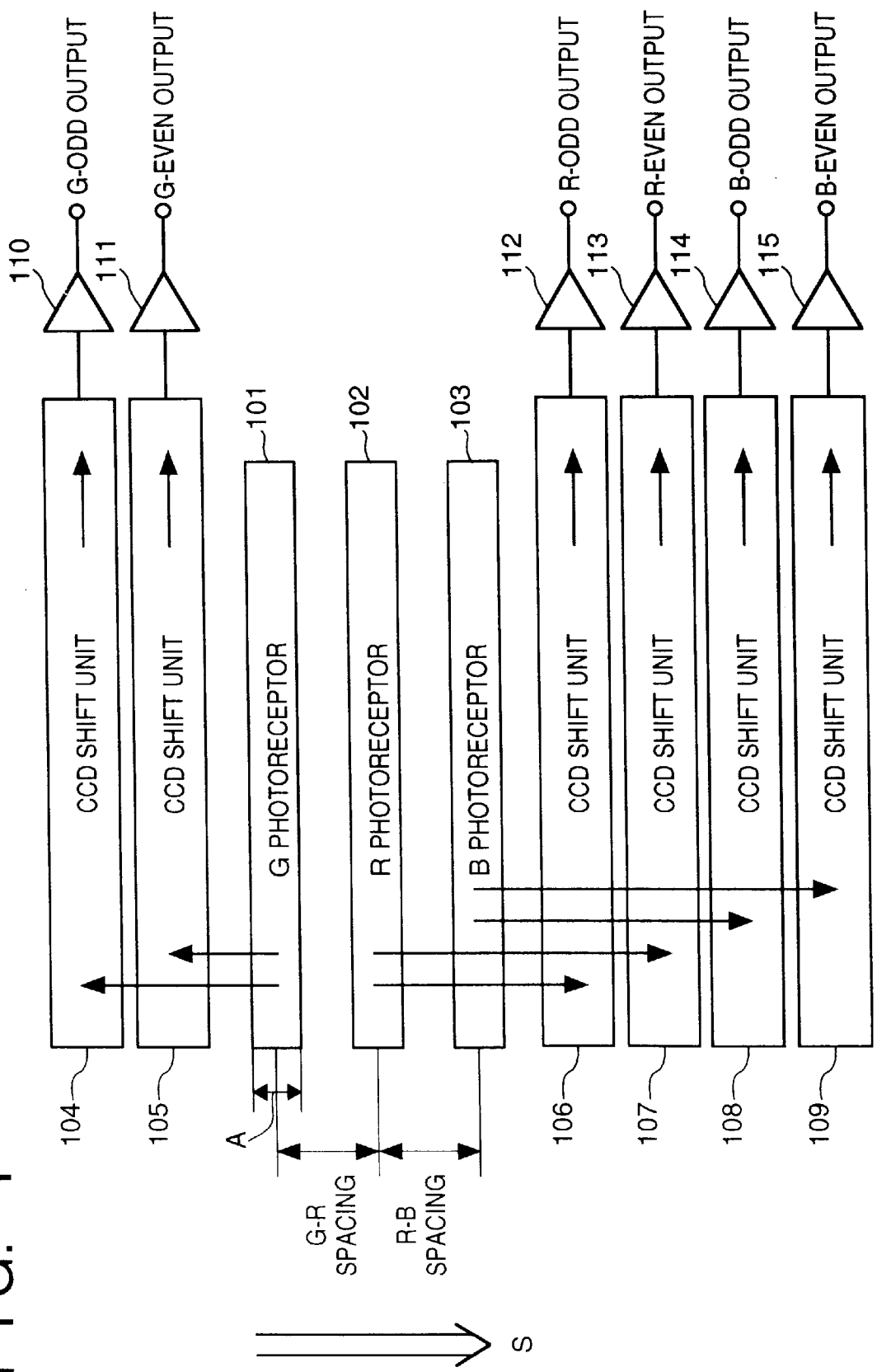
FIG. 1 is a block diagram showing the construction of a linear image sensor according to a first embodiment of the present invention.

Preferred embodiments of the present invention will be described in detail in accordance with the accompanying drawings.

A Color Image Reading Apparatus

First, the construction of a color image reading apparatus using a linear image sensor according to a first embodiment will be described with reference to FIG. 2.

The color image reading apparatus irradiates an original 212 placed on a glass platen 211 using illumination light source 210 having a reflection shade 209, and converges reflected light from the original 212 on a photoreception surface of a CCD (color linear image sensor) 201 via mirrors 208, 205, 206 and a lens 202, thus forms an image.

Figure 2:
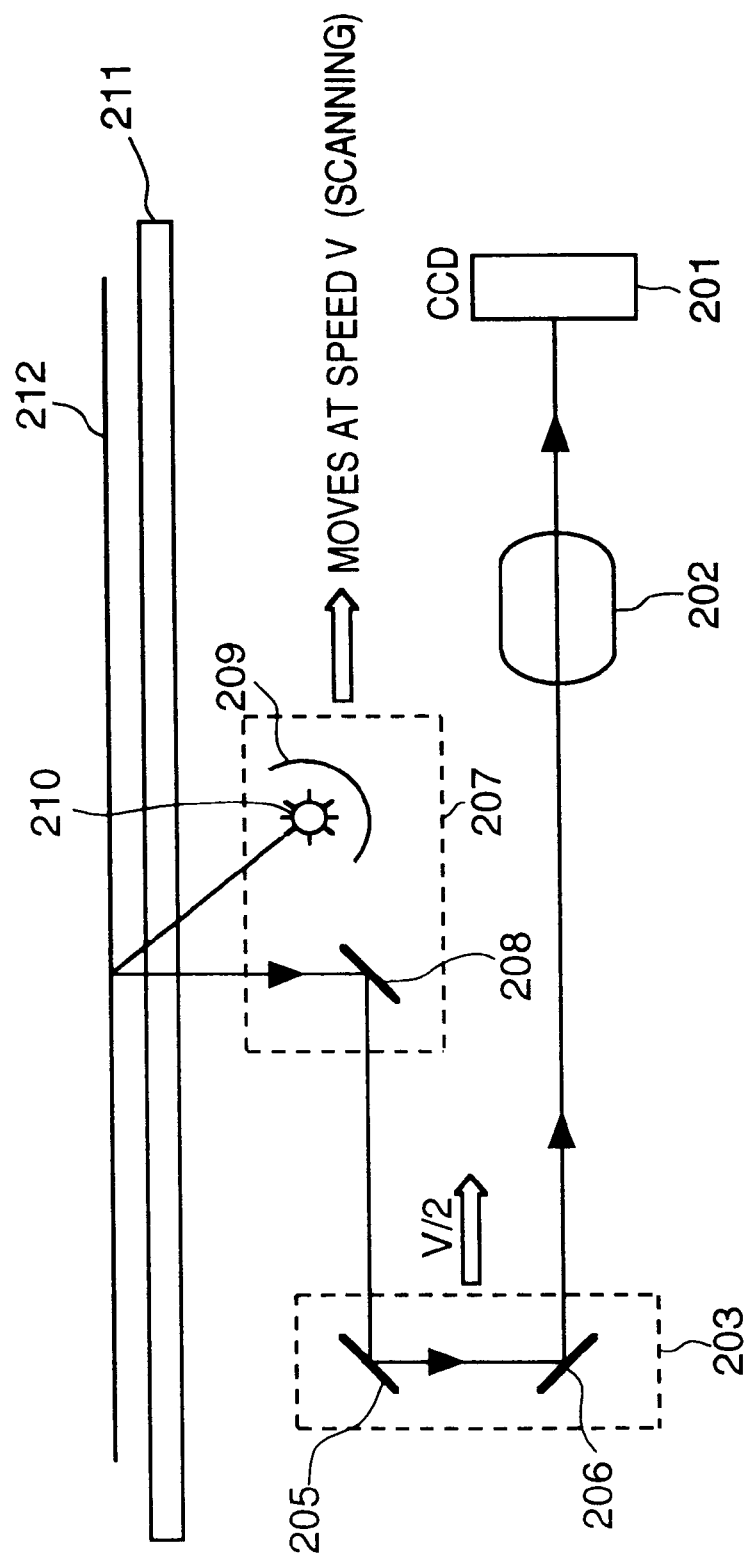
FIG. 2 is a schematic cross-sectional view showing a color image reading apparatus using the linear image sensor of the first embodiment.

In FIG. 2, the apparatus reads the entire image from the original 212 by moving a dotted-line portion 207 in a direction represented by a double-line arrow at a speed V, and moving a dotted-line portion 203 in a direction also represented by a double-line arrow at a speed V/2.

First Embodiment

FIG. 1 shows the construction of the linear image sensor according to the first embodiment of the present invention.

Figure 3:
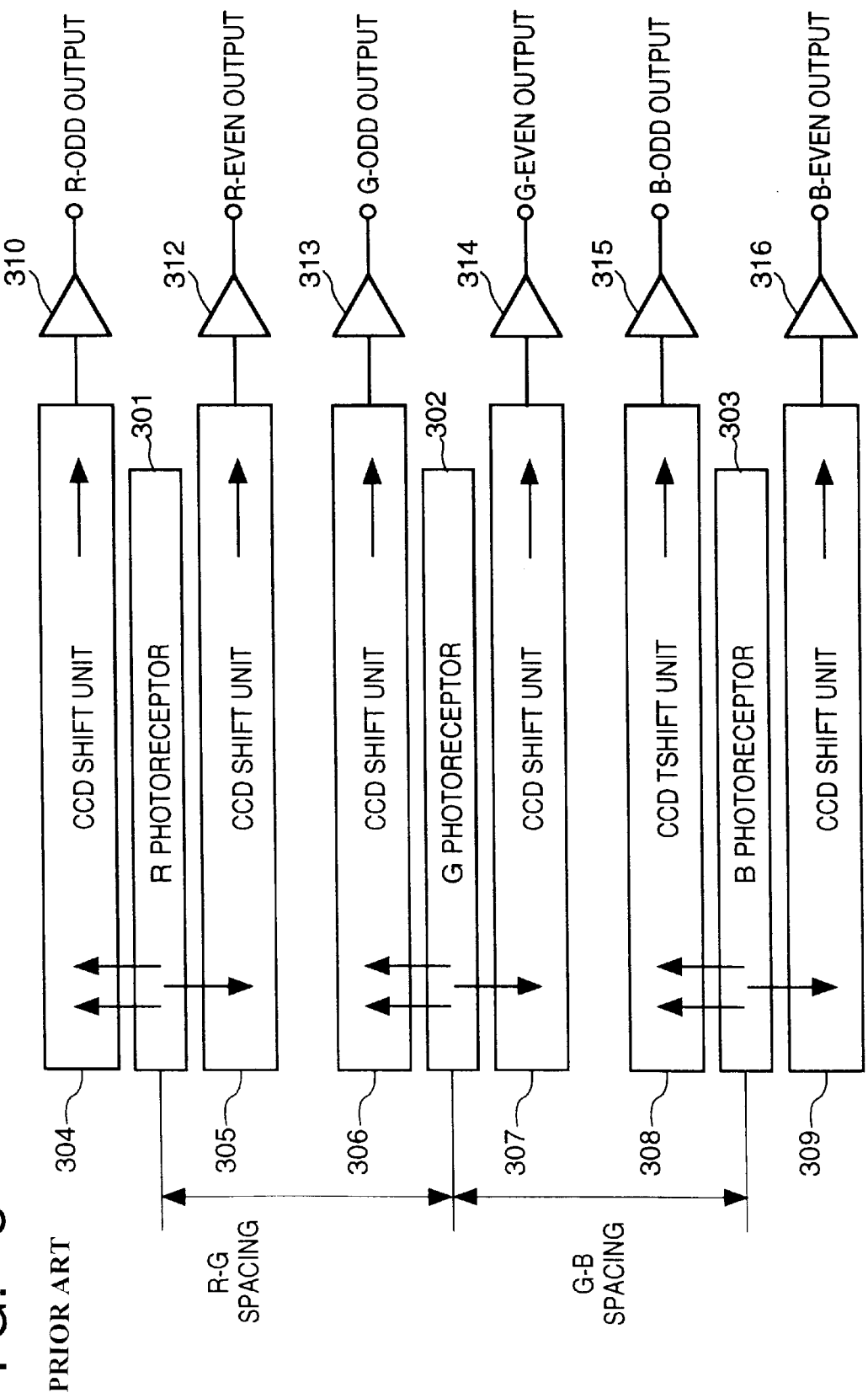
FIG. 3 is a block diagram showing the construction of a conventional linear image sensor.

In FIG. 1, reference numerals 101 to 103 denote photoreceptors having R, G and B color filters. Each photoreceptor has diodes for converting a received light quantum into electric charges for each pixel. Different from the conventional linear image sensor as shown in FIG. 3, CCD shift units 104 to 109 are not alternatively provided with the R, G and B photoreceptors 101 to 103, accordingly, the spacings among the photoreceptors 101 to 103 can be reduced.

In FIG. 1, there is some spacing between the G photoreceptor 101 to the R photoreceptor 102 and between the R photoreceptor 102 to the B photoreceptor 103, however, these spacings may be reduced by providing the photoreceptor closer to each other till they come in contact with each other. Accordingly, in comparison with the conventional arrangement where the CCD shift units are alternately provided with the photoreceptors, the spacing among the photoreceptors can be smaller. This reduces memory requirement for correcting the difference amount between reading positions corresponding to the spacing between the photoreceptors.

In the construction according to the first embodiment shown in FIG. 1, the photoreceptors 101 to 103 are provided between two sets of CCD shift units 104 and 105, and CCD shift units 106 to 109 in parallel in a subscanning direction. That is, the CCD shift units 104 and 105 for the G photoreceptor 101 are provided at an upper part in FIG. 1, and the CCD shift units 106 to 109 for the R photoreceptor 102 and the B photoreceptor 103 are provided at a lower part in FIG. 1. This arrangement can reduce the number of relay photoreceptors upon intrapixel transfer where electric charges accumulated at one photoreceptor are transferred via another photoreceptor for another color.

Further, in this construction, upon intrapixel transfer, the transfer direction in which electric charges are transferred and the subscanning direction in which an original image is scanned by the linear image sensor are in the same direction.

In FIG. 1, electric charges accumulated at the R photoreceptor 102 are transferred to the CCD shift units 106 and 107 via the B photoreceptor 103. Then, the CCD shift units 106 and 107 shift the electric charges to amplifiers 112 and 113 which output R-ODD output and R-EVEN output. In this manner, the transfer direction in which electric charges are transferred and a subscanning direction in which an image is scanned on the linear image sensor coincide.

Figure 4:
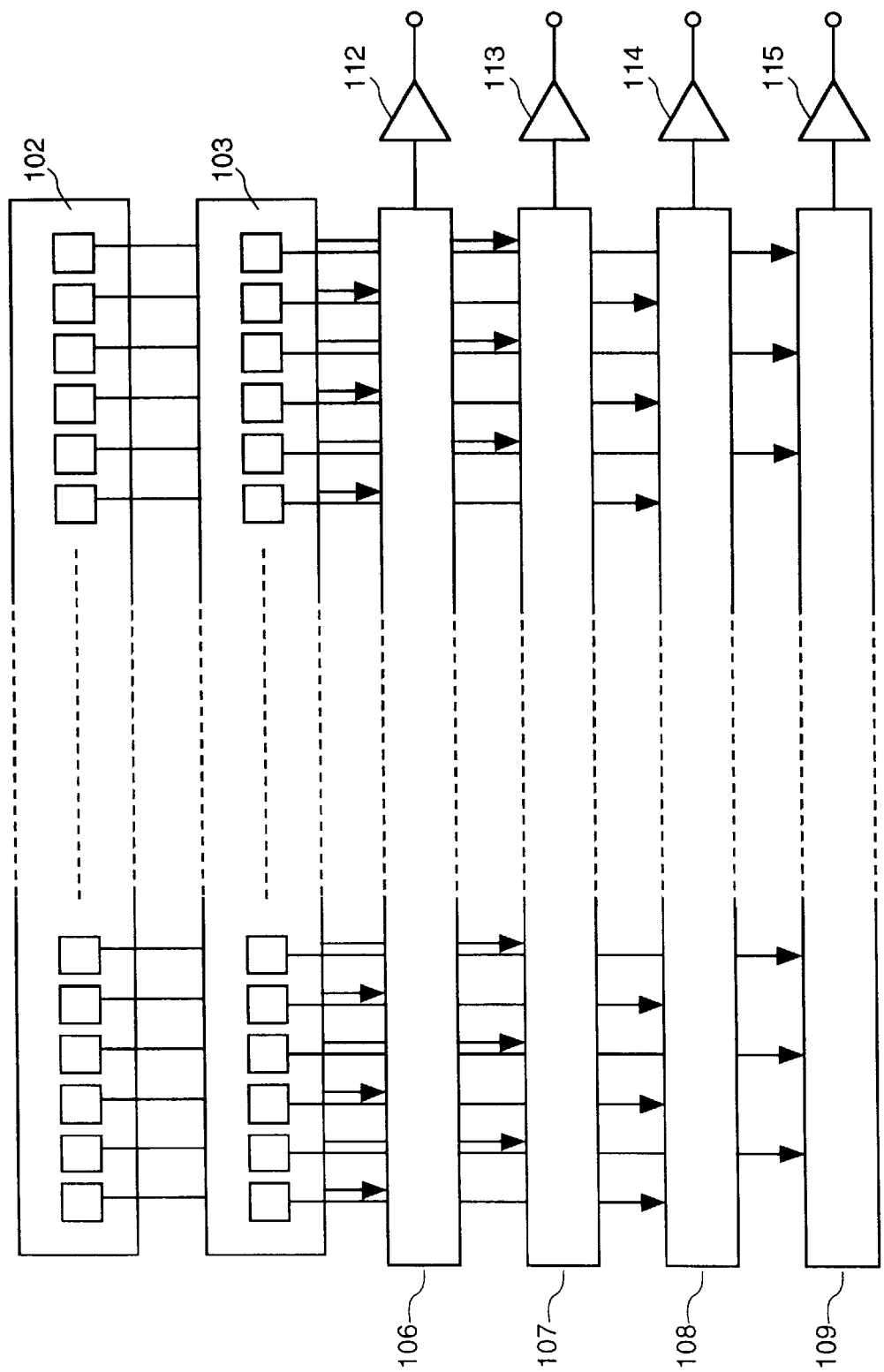
FIG. 4 is a block diagram showing connection between R photoreceptor and B photoreceptor, and corresponding CCD shift units, according to the first embodiment.

FIG. 4 shows connection between the R photoreceptor 102 and the B photoreceptor 103, and corresponding CCD shift units 106 to 109. In FIG. 4, the parts corresponding to those in FIG. 1 have the same reference numerals and the explanations of these parts will be omitted.

As shown in FIG. 4, upon intrapixel transfer, color mixture due to transferring the electric charges via the relay photoreceptor for another color, where a slight amount of electric charges are generated at the relay photoreceptor, can be reduced to a minimum amount. Upon this transfer, amount E of the finally outputted electric charges including color mixture is expressed by the following equation:

$$E = EM + ES \times (TB/TA) \tag{1}$$

EM: amount of electric charges accumulated at a photoreceptor before transferred via another photoreceptor;

ES: amount of electric charges accumulated at another photoreceptor for another color;

TA: accumulation time; and

TB: transfer time

In the equation (1), [ES×(TB/TA)] is an amount of electric charges (color mixture) occurred during transfer via the photoreceptor for another color. A ratio α of the amount of color-mixture electric charges with respect to the amount E of finally-outputted electric charges is:

$$\alpha = (TB/TA) \times (ES/EM) \tag{2}$$

As (TB/TA) is a constant determined by CCD characteristics and the like, in order to reduce the ratio α of the amount of electric charges as much as possible, ES must be set to be a small value, while EM must be set to be a large value.

In this embodiment, upon intrapixel transfer, a photoreceptor (e.g., the R photoreceptor 102 in FIG. 1) that transfers electric charges has a larger electric charge-generating characteristic, while a relay photoreceptor (e.g., the B photoreceptor 103 in FIG. 1) that passes the electric charges has a smaller electric charge-generating characteristic. This lowers ratio α of the amount of electric charges as the cause of color mixture with respect amount E of finally-outputted electric charges.

Next, occurrence of color mixture upon intrapixel transfer as shown in FIG. 1 will be described below based on the relation between image scanning direction and electric charge transfer direction.

Figure 5A:
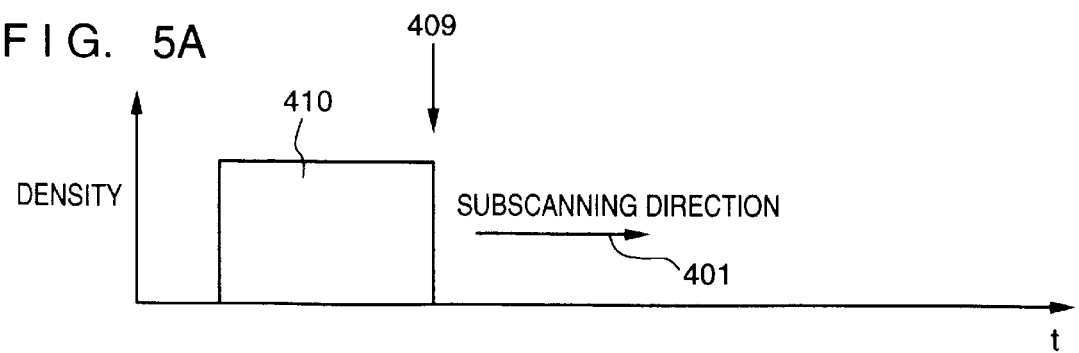
FIGS. 5A to 5E are graphs showing accumulation of electric charges and color mixture in a case where a scanning direction and a transfer direction are opposite to each other.
Figure 5B:
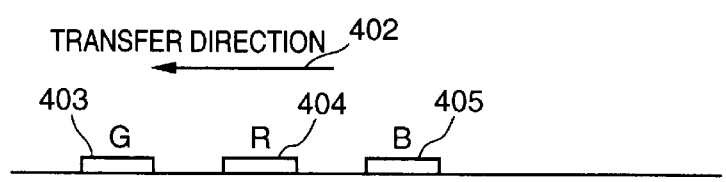
Figure 5C:
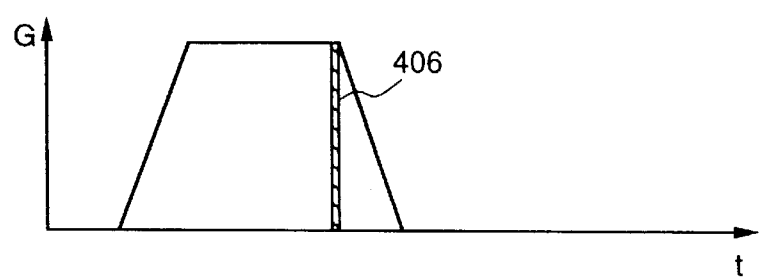
Figure 5D:
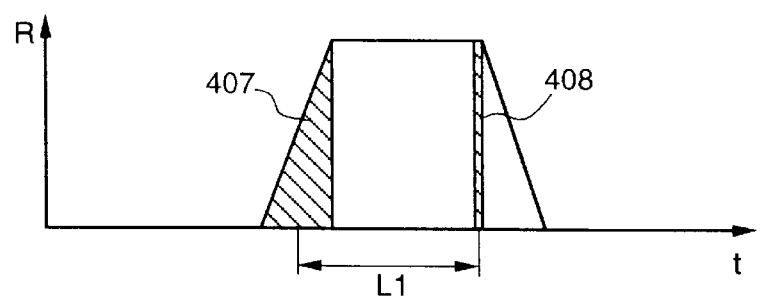
Figure 5E:
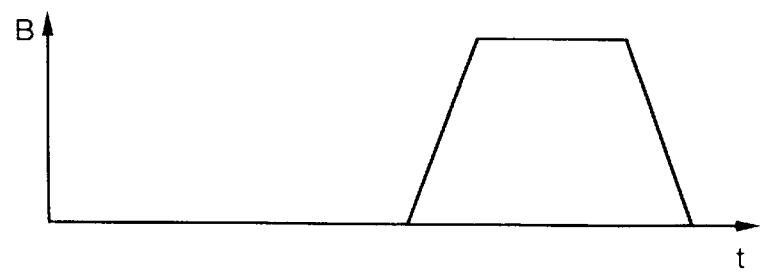

In FIGS. 5A to 5E, image information 410 in FIG. 5A moves in a subscanning direction 401. At this time, the image information 410 is advanced in the subscanning direction 401 and images are formed on the photoreception surfaces of the photoreceptors 403 to 405. A main-scanning direction is vertical to the subscanning direction 401. FIGS.

5C to 5E show an amount of electric charges at the respective photoreceptors when an edge portion 409 of the image information 410 moves along the subscanning direction 401. As the image information 410 passes over an R photoreceptor 404, electric charges represented by a hatched portion 407 are accumulated. Assuming that the transfer direction for transferring the electric charges via another photoreceptor is a direction 402 opposite to the direction 401, the electric charges accumulated at the R photoreceptor 404 are transferred via a G photoreceptor 403.

Immediately after the accumulation of electric charges for a predetermined period at the R photoreceptor 404, the R photoreceptor 404 transfers the electric charges accumulated by the indicated hatched portion 407. At this time, the electric charges of color mixture upon intrapixel transfer via the G photoreceptor 403 is a part of the electric charges as indicated by a hatched portion 406 in FIG. 5C. Regarding the electric charges accumulated at the R photoreceptor 404, the information of the hatched portion 406 corresponds to a hatched portion 408 in FIG. 5D. Accordingly, when the subscanning direction 401 and the transfer direction 402 are opposite to each other, the information of color mixed in the information (electric charges) from the R photoreceptor 404 is shown as the hatched portion 406 in FIG. 5C, and the mixed information (406) corresponds to a position (hatched portion 408) delayed by time L1 from the hatched portion 407.

FIGS. 6A to 6E show a case where a subscanning direction 501 and a transfer direction 502 are in the same direction. The electric charges collected at an R photoreceptor 504 are accumulated for a predetermined period (hatched portion 507 in FIG. 6D) and transferred via a B photoreceptor 505. At this time, the electric charges of color mixture occur, as represented by a hatched portion 506 in FIG. 6E. Regarding the electric charges accumulated at the R photoreceptor 504, the information of the hatched portion 506 corresponds to the hatched portion 508 in FIG. 6D. Accordingly, the information of color mixture included in the information from the R photoreceptor 504 is positioned advanced by time L2 from the electric charges 507 accumulated at the R photoreceptor 504.

It should be noted that the influence of color mixture on image information depends on the distance between a photoreceptor that causes color mixture and the photoreceptor that originated the image information. In case of drawing pattern in which the contrast radically changes in short change periods, it is apparent that as a photoreceptor that causes color mixture is closer to an originator photoreceptor, the influence of color mixture becomes smaller.

Assuming that the width of a photoreceptor is A, and the pitch between photoreceptors in a subscanning direction is 2A, the position of image information to include color mixture, due to the difference between the transfer direction and the subscanning direction is:

L1=2.5A (subscanning direction and transfer direction are opposite to each other)

L2=1.5A (subscanning direction and transfer direction are in the same direction)

Preferably a subscanning direction in which an image is subscanned and a transfer direction in which electric charges are transferred via another photoreceptor are in the same direction.

This construction where subscanning direction and transfer direction correspond with each other may be added to the construction where a photoreceptor that transfers electric charges has a larger electric charge-generating characteristic, while a photoreceptor that passes the electric charges of different color has a smaller electric charge-generating characteristic.

The spectral response characteristic of a linear image sensor with respect to incident light differs dependent on the semiconductor material, structure of photosensitive area, process of surface etc. However, most linear image sensors have a peak wavelength on the long wavelength side of a visible light spectrum.

Figure 7:
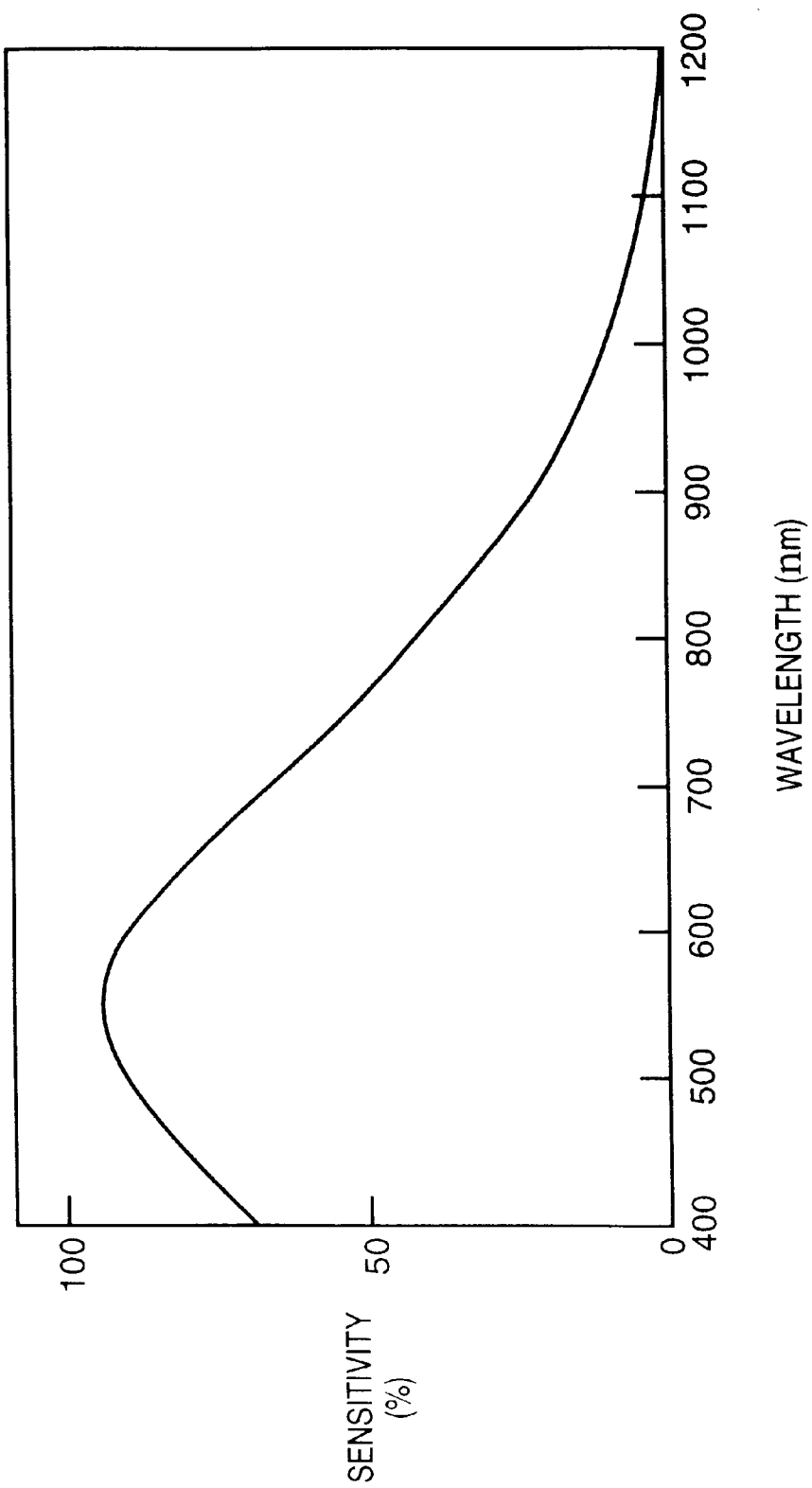
FIG. 7 is a graph showing spectral responsivity characteristics of the linear image sensor.

FIG. 7 shows the spectral responsive characteristic of a linear image sensor using silicon material.

In FIG. 7, in a visible light area (about 380 nm–700 nm wavelengths), the sensitivity on the short wavelength side is low.

Figure 8:
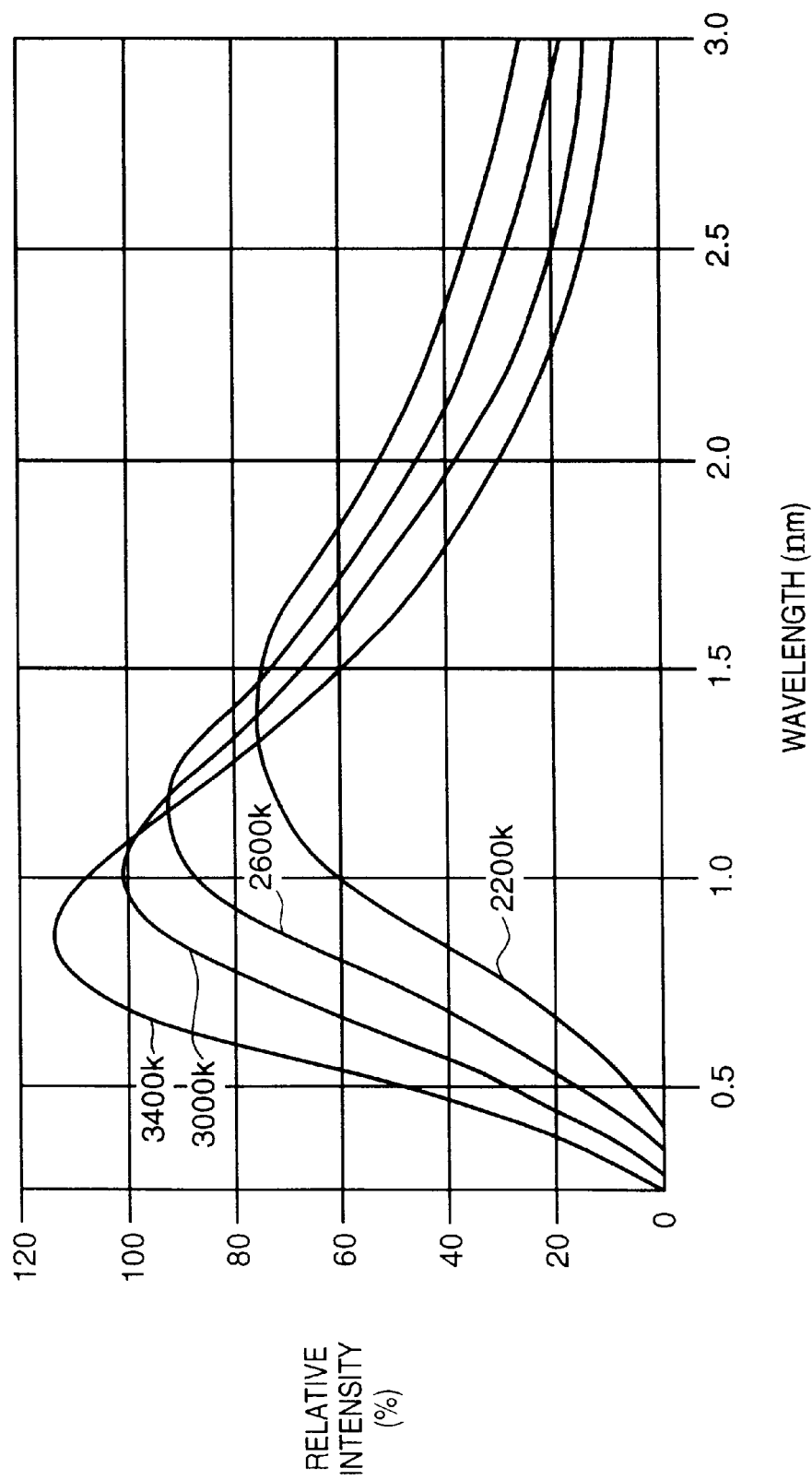
FIG. 8 is a graph shoring energy distribution of light from a halogen lamp.

Usually, a halogen lamp is employed as a light source having spectral energy distribution as shown in FIG. 8. FIG. 8 shows the same visible light area (about 380 nm–700 nm wavelengths), in which the light-emitting energy of the long wavelength side is high.

In a case where an optical system scanning is constructed using a linear image sensor, generally, the quantity of electric charge-generating of a color having a short wavelength characteristic is small. Accordingly, a photoreceptor for receiving the color component having short wavelength is used as a relay photoreceptor that passes electric charges from another photoreceptor. That is, it is important that in consideration of spectral characteristics, this photoreceptor having a smaller electric charge-generating characteristic is a B (blue) photoreceptor.

Also, the photoreceptor having a larger electric charge-generating characteristic that transfers electric charges via another photoreceptor is a G (green) or R (red) photoreceptor.

Second Embodiment

The construction of the image sensor of the present invention is not limited to that in FIG. 1. The image sensor may have a construction as shown in FIG. 9.

Figure 9:
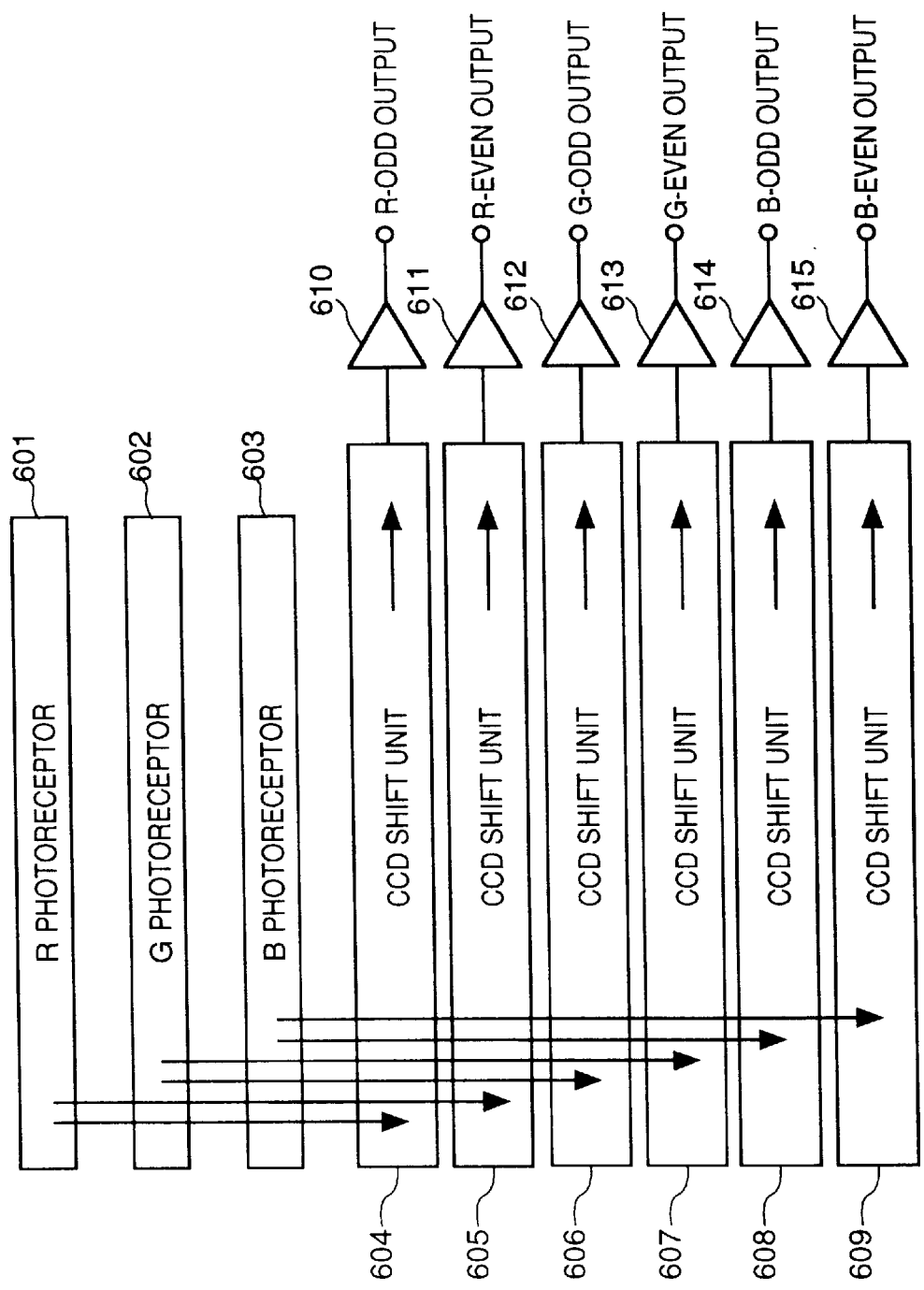
FIG. 9 is a block diagram showing the construction of a linear image sensor according to a second embodiment of the present invention.

FIG. 9 shows arrangement where a set of CCD shift units 604 to 609 are not provided between photoreceptors 601 to 603, but they are provided at one side. Note that the photoreceptors 601 to 603 and the CCD shift units 604 to 609 correspond to the photoreceptors 101 to 103 and the CCD shift units 104 to 109 in FIG. 1.

Also in this embodiment, electric charges accumulated at each photoreceptor are transferred to the CCD shift units via another photoreceptor. As the CCD shift units 604 to 609 are provided as a set at one side in a subscanning direction, the photoreceptor that transfers electric charges via the other two photoreceptors is the R photoreceptor 601 having the larger electric charge-generating characteristic. The photoreceptor, closest to the CCD shift units 604 to 609, that passes electric charges from the other photoreceptors is the B photoreceptor 603 having the smaller electric charge-generating characteristic.

Similar to the first embodiment, it is also possible to reduce the influence of color mixture due to electric charges occurred at a photoreceptor used as a relay photoreceptor in intrapixel transfer by setting the transfer direction in which electric charges are transferred from a photoreceptor to a CCD shift unit to and the subscanning direction in which an image is subscanned by the image sensor into the same direction.

FIG. 10 shows the construction of an image data generator of an image reading apparatus using the linear image sensor of the second embodiment.

In FIG. 10, numeral 801 denotes a B (blue)-signal input unit including the B photoreceptor 601 and the corresponding CCD shift units 608 and 609; 802, an R (red)-signal input unit including the R photoreceptor 602 and the corresponding CCD shift units 606 and 607; 803, a G (green)-signal input unit including the G photoreceptor 601 and the corresponding CCD shift units 604 and 605; 804 to 812, line buffers for storing pixel data (binary or multi-level data) corresponding to the number of reading pixels of the photoreceptors; and 814 to 816, A/D converters respectively for inputting an analog image signal from a corresponding color signal input unit and converting the signal into a digital signal.

Similar to FIG. 1, as the spacing between the photoreceptors is "2A", when B image data read by the B photoreceptor of the B-signal input unit 801 is stored in the line buffer 808, R image data corresponding to the stored B image data is stored in the line buffer 811, further, G image data corresponding to the stored B image data is stored in the line buffer 812. The image data of the respective color components are simultaneously read out of the line buffers 808, 811 and 812, and color image data for one line is generated by a color-signal generator 813. Assuming that the A/D converters 814 to 816 are respectively 8-bit A/D converters, one pixel of the image data read by the optical scanning apparatus is represented by 24 bits. The number of line buffers can be reduced by reducing the pitch between the photoreceptors. Thus, the generated color image data is outputted to an external device such as a computer connected to the image reading apparatus.

Note that the signal-input units 801 to 803 may respectively comprise a combination of a photoreceptor and a corresponding CCD shift unit as shown in FIG. 9.

As described above, according to the present embodiment, the arrangement where the CCD shift units as a set are provided at one side in the subscanning direction can reduce color mixture of electric charges accumulated at a photoreceptor with electric charges caused at another photoreceptor for another color, due to intrapixel transfer, to a minimum level.

Further, upon transferring electric charges, a photoreceptor that passes electric charges has a smaller electric charge-generating characteristic, while a photoreceptor that transfers the electric charges has a larger electric charge-generating characteristic. This suppresses the amount of electric charges causing color mixture.

Further, according to the present embodiment, the arrangement, where a transfer direction in which electric charges accumulated at a photoreceptor are transferred and a subscanning direction in which an image is subscanned by the linear image sensor are in the same direction, shortens the distance between a photoreceptor that transfers accumulated electric charges and a photoreceptor that passes the electric charges to a CCD shift unit, thus reduces the influence of color mixture upon intrapixel transfer.

In the above embodiments, the image reading apparatus uses photosensors for R, G and B (three colors), however, the present invention is not limited to these photosensors, but is applicable to any image reading apparatus which uses photosensors for at least two colors. For example, if two photosensors are for red (R) and blue (B), two CCD shift units corresponding to these photosensors are both provided on the B photosensor side, so that electric charges from the R photosensor are transferred via the B photosensor to the CCD shift units.

As described above, the arrangement, where photoreceptors are provided close to each other and shift units are also provided close to each other, reduces memory capacity for correcting the difference among reading positions for respective colors.

Further, the arrangement, where photoreceptors are provided between a plurality of shift units, suppresses the amount of color mixture caused by intrapixel transfer in which electric charges accumulated at one photoreceptor are transferred via another photoreceptor, to a minimum level.

According to the present invention, the arrangement, where a photoreceptor that transfers electric charges is for a color corresponding to a larger electric charge-generating characteristic while a photoreceptor that passes the electric charges is for a color corresponding to a smaller electric charge-generating characteristic, lowers the rate of occurrence of color mixture.

As described above, according to the present invention, the image sensing device and the image reading apparatus using the image sensing device of the present invention, having arrangement, where a transfer direction in which electric charges are transferred and a subscanning direction in which an image is subscanned by the linear image sensor are in the same direction, therefore positions of color mixture of respective colors are close to each other, reduces the amount of color mixture caused by intrapixel transfer and suppresses the influence of the color mixture on image quality.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention, constitutes the invention. The system or apparatus installed with the program read from the medium realizes the functions according to the invention.

The present invention is not limited to the above embodiments and various changes and modifications can be made within the spirit and scope of the present invention. Therefore, to appraise the public of the scope of the present invention, the following claims are made.

What is claimed is:

1. An image sensing device which reads a color image and outputs color image data, comprising:

a plurality of photoreceptors, provided close to each other in parallel, for receiving light signals corresponding to respective colors and generating electric charges in accordance with intensities of the received light signals, wherein the plurality of photoreceptors include at least one first photoreceptor and at least one second photoreceptor having less sensitivity for light than that of the first photoreceptor;

a plurality of shift units for receiving the electric charges from said plurality of photoreceptors and shifting the received electric charges; and transfer means for transferring the electric charges from the first photoreceptor corresponding to a predetermined color to a shift unit corresponding to the first photoreceptor and, in a case where the second photoreceptor corresponding to another color exists between the first photoreceptor and the shift unit, transferring the electric charges via the second photoreceptor so that color mixture in the electric charges from the first photoreceptor caused by electric charges from the second photoreceptor is reduced.

2. The image sensing device according to claim 1, wherein the second photoreceptor receives a light signal of a color having short wavelength.

3. The image sensing device according to claim 1, wherein said plurality of photoreceptors have a plurality of photoelectric converters arranged in parallel to each other.

4. The image sensing device according to claim 1, wherein the first photoreceptor receives a light signal of a light corresponding to a larger electric charge-generating characteristic.

5. The image sensing device according to claim 1, wherein said plurality of shift units are divided into two groups and said plurality of photoreceptors are provided between the groups of shift units.

6. The image sensing device according to claim 1, wherein said plurality of shift units are provided at one side, close to said photoreceptors, parallel to said photoreceptors.

7. The image sensing device according to claim 1, wherein the second photoreceptor receives a light signal of blue color component.

8. The image sensing device according to claim 3, wherein the first photoreceptor receives a light signal of a red or green color component.

9. The image sensing device according to claim 1, wherein said shift units have a shift circuit for outputting even-numbered electric charges and a shift circuit for outputting odd-numbered electric charges per one color.

10. An image reading apparatus which photoelectrically reads a color image and outputs color image data, comprising:
an image sensing device as a photoreception unit, comprising:
a plurality of photoreceptors, provided close to each other in parallel, for receiving light corresponding to respective colors and generating electric charges in accordance with intensities of the received light, wherein the plurality of photoreceptors include at least one first photoreceptor and at least one second photoreceptor having less sensitivity for light than that of the first photoreceptor;
a plurality of shift units for receiving the electric charges from said plurality of photoreceptors and shifting the received electric charges; and
transfer means for transferring the electric charges from the first photoreceptor corresponding to a predetermined color to a shift unit corresponding to the first photoreceptor and, in a case where the second photoreceptor corresponding to another color exists between the first photoreceptor and the shift unit, transferring the electric charges via the second photoreceptor so that color mixture in the electric charges from the first photoreceptor caused by electric charges from the second photoreceptor is reduced;
moving means for moving said image sensing device relatively to an original color image; and
output means for outputting original color image data, based on the electric charges outputted from the shift units respectively corresponding to said photoreceptors.

11. The image reading apparatus according to claim 10, wherein the second photoreceptor receives a light signal of a color having short wavelength.

12. The image reading apparatus according to claim 10, wherein said output means has a plurality of buffers for synchronizing the image signals from said photoreceptors with each other.

13. An image sensing device comprising:
first and second photosensors provided adjacent to each other in parallel; and
shift means, provided close to said second photosensor, for receiving electric charges from said first photosensor,
wherein said device transfers electric charges from said first photosensor via said second photosensor to said shift means, and wherein said second photosensor has sensitivity for light lower than that of said first photosensor, so that color mixture in the electric charges from the first photosensor caused by electric charges from the second photosensor is reduced.

14. The image sensing device according to claim 13, wherein said first photosensor receives a first color light, while said second photosensor receives a second color light different from the second color light.

15. The image sensing device according to claim 13, wherein the second color light is blue.

16. An image reading apparatus which reads a color image by scanning an original in a main scanning direction and a subscanning direction while irradiating the original comprising:
a linear image sensor having a plurality of line sensors, corresponding to respective colors, provided close to each other, for transferring electric charges generated at a photoreceptor of one line sensor to a shift unit corresponding to the line sensor via another photoreceptor of another line sensor; and
moving means for moving an original image relative to the linear image sensor,
wherein a direction in which the original image moves over the linear image sensor and a transfer direction in which said linear image sensor transfers the electric charges at the photoreceptor of the one line sensor to said shift unit corresponding to the line sensor via at least one of the other photoreceptor of the other line sensor are the same.

17. The image reading apparatus according to claim 16, wherein the transfer direction is the main-scanning direction and the relative direction is the subscanning direction.

18. The image reading apparatus according to claim 16, wherein the plurality of line sensors are three line sensors having red, green and blue color filters respectively, corresponding to red, greed and blue color components.

19. An image reading apparatus comprising:
a first line sensor;
a second line sensor provided close to said first line sensor;
shift means, provided at a position close to said second line sensor and except between said first and second line sensors, for receiving electric charges at said first and second line sensors; and
subscanning means for moving an object image relative to said first and second line sensors in a subscanning direction,
wherein said apparatus transfers electric charges at said first line sensor to said shift means via said second line sensor in a transfer direction, and wherein the transfer direction and a direction in which the object image moves over the first and second line sensors by said subscanning means are the same.

20. The image reading apparatus according to claim 19, wherein the sensitivity of said second line sensor is lower than that of said first line sensor.

21. An image sensing device which reads a color image and outputs color image data, comprising:
a plurality of photoreceptors, provided close to each other and in parallel, for receiving light signals corresponding to respective colors and generating electric charges in accordance with intensities of the received light signals, wherein the plurality of photoreceptors include at least one first photoreceptor, at least one second photoreceptor having less sensitivity for light than that of the first photoreceptor and at least one third photoreceptor having less sensitivity for light than that of the second photoreceptor;

a plurality of shift units for receiving the electric charges from said plurality of photoreceptors and shifting the received electric charges; and transfer means for transferring the electric charges from the first photoreceptor corresponding to a predetermined color to a shift unit corresponding to the first photoreceptor and, in a case where third photoreceptor corresponding to another color exists between the first photoreceptor and the shift unit corresponding to the first photoreceptor, transferring the electric charges via the third photoreceptor so that color mixture in the electric charges from the first photoreceptor caused by electric charges from the third photoreceptor is reduced.

22. The image sensing device according to claim 21, wherein the third photoreceptor receives a light signal of a color having shorter wavelength than that of the first and second photoreceptors.

23. The image sensing device according to claim 21, wherein said plurality of photoreceptors have a plurality of photoelectric converters arranged in parallel to each other.

24. The image sensing device according to claim 21, wherein the first photoreceptor receives a light signal of a light corresponding to a larger electric charge-generating characteristic.

25. The image sensing device according to claim 21, wherein said plurality of shift units are divided into two groups and said plurality of photoreceptors are provided between the groups of shift units.

26. The image sensing device according to claim 21, wherein said plurality of shift units are provided at one side, close to said photoreceptors and parallel to said photoreceptors.

27. The image sensing device according to claim 21, wherein the third photoreceptor receives a light signal of a blue color component.

28. The image sensing device according to claim 23, wherein the first photoreceptor receives a light signal of a red color component.

29. The image sensing device according to claim 21, wherein said shift units have a shift circuit for outputting even-numbered electric charges and a shift circuit for outputting odd-numbered electric charges per one color.

30. An image reading apparatus which photoelectrically reads a color image and outputs color image data, comprising:

an image sensing device as a photoreception unit, comprising:

a plurality of photoreceptors, provided close to each other in parallel, for receiving light corresponding to respective colors and generating electric charges in accordance with intensities of the received light, wherein the plurality of photoreceptors include at least one first photoreceptor, at least one second photoreceptor having less sensitivity for light than that of the first photoreceptor and at least one third photoreceptor having less sensitivity for light than that of the second photoreceptor;

a plurality of shift units for receiving the electric charges from said plurality of photoreceptors and shifting the received electric charges; and transfer means for transferring the electric charges from the first photoreceptor corresponding to a predetermined color to a shift unit corresponding to the first photoreceptor and, in a case where the third photoreceptor corresponding to another color exists between the first photoreceptor and the shift unit, transferring the electric charges via the third photoreceptor so that color mixture in the electric charges from the first photoreceptor caused by electric charges from the third photoreceptors is reduced;

conveyance means for conveying said image sensing device relatively to an original image; and output means for outputting original image data, based on the electric charges received by said plurality of photoreceptors and outputted from the shift units respectively corresponding to said photoreceptors.

31. The image reading apparatus according to claim 30, wherein the third photoreceptor receives a light signal a color having shorter wavelength than that of the first and second photoreceptors.

32. The image reading apparatus according to claim 30, wherein said output means has a plurality of buffers for synchronizing the image signals for said photoreceptors with each other.

33. An image sensing device comprising:

first, second and third photosensors provided adjacent to each other in parallel; and shift means, provided close to said third photosensor, for receiving electric charges from said first and third photosensors, wherein said device transfers electric charges from said first photosensor via said third photosensor to said shift means, and wherein said third photosensor has sensitivity for light lower than that of said first and second photosensors, so that color mixture in the electric charges from the first photosensor caused by electric charges from the third photosensor is reduced.

34. The image sensing device according to claim 33, wherein said first photosensor receives a first color light, and wherein said third photosensor receives a second color light different from the first color light.

35. The image sensing device according to claim 34, wherein the second color light is blue.

36. An image sensing device comprising:

a first photoreceptor which receives image information and generates first electric charges representative of a first color;

a second photoreceptor, located adjacent to said first photoreceptor in a transfer direction of the first electric charges, which receives the image information and generates second electric charges representative of a second color, wherein said first photoreceptor has a larger electric charge-generating characteristic than that of said second photoreceptor; and a memory device, coupled to said first and second photoreceptors, which receives the first electric charges transferred from said first photoreceptor through said second photoreceptor, and the second electric charges transferred from said second photoreceptor.

37. An image sensing device comprising:

a first photoreceptor which receives image information of a color image scanned in main scanning and subscanning directions, and generates first electric charges representative of a first color;

a second photoreceptor, located adjacent to said first photoreceptor in a transfer direction of the first electric charges, which receives the image information and generates second electric charges representative of a second color, wherein said first photoreceptor has a larger electric charge-generating characteristic than that of said second photoreceptor, and wherein the transfer direction is parallel to the subscanning direction of the color image; and a memory device, coupled to said first and second photoreceptors, which receives the first electric charges transferred from said first photoreceptor through said second photoreceptor, and the second electric charges transferred from said second photoreceptor.

38. An image sensing device comprising:

a plurality of photoreceptors for receiving image information and generating electric charges representative of specific colors, wherein said photoreceptors are aligned in a transfer direction of the electric charges in order of strength of an electric charge-generating characteristic so that a photoreceptor having the largest electric charge-generating characteristic is located most upstream in the transfer direction among said photoreceptors; and a plurality of memories, coupled to said photoreceptors and arranged in the transfer direction, which receive the electric charges transferred from said plurality of photoreceptors.

39. A method comprising the steps of:

scanning a color image to generate image information;

converting the image information into electric charges for each specific color; and transferring the electric charges to a memory for each specific color while selecting, if the electric charges of one color pass the electric charges of another color, a transfer path based on a ratio of an amount of the electric charges to be passed to an amount of the electric charge to be transferred.

40. The method according to claim 39, wherein said scanning step scans the color image in main-scanning and subscanning directions and said transfer path is aligned to the subscanning direction.

* * * * *

UNITED STATES PATENT AND TRADEMARK OFFICE
CERTIFICATE OF CORRECTION

PATENT NO. : 5,995,249
DATED : November 30, 1999
INVENTOR(S) : Hiroshi Sato, et al.

It is certified that error appears in the above-identified patent and that said Letters Patent is hereby corrected as shown below:

ON THE TITLE PAGE

Under [30] "Foreign Application Priority Data", delete "Sept. 9, 1994" and insert therefor -- Aug 9, 1994 --.

IN THE DRAWINGS

Figure 6A:
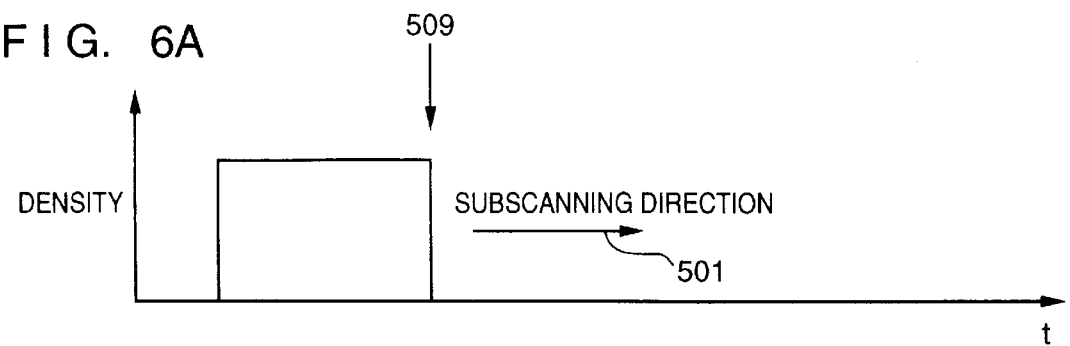
FIGS. 6A to 6E are graphs showing accumulation of electric charges and color mixture in a case where a scanning direction and a transfer direction correspond with each other.
Figure 6B:
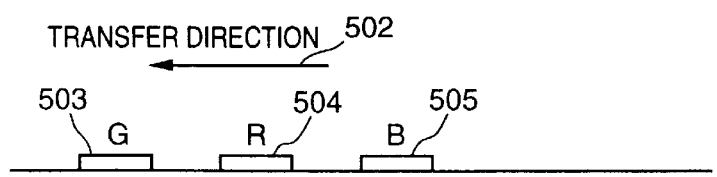
Figure 6C:
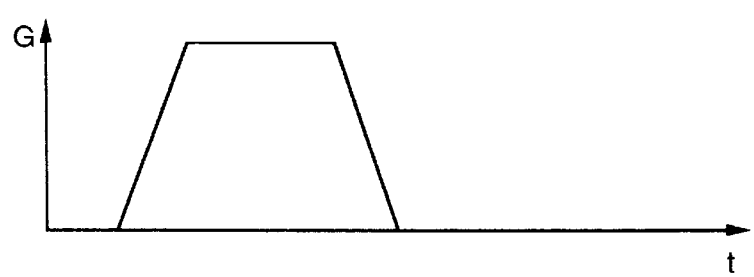
Figure 6D:
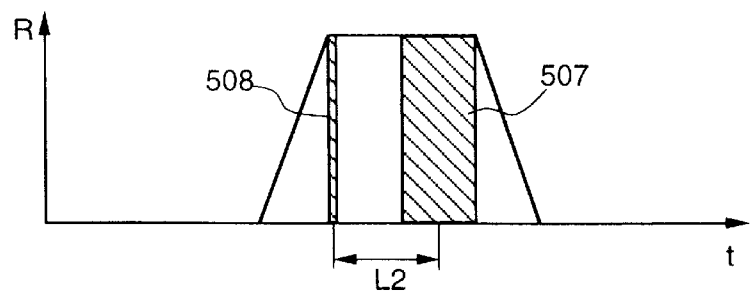
Figure 6E:
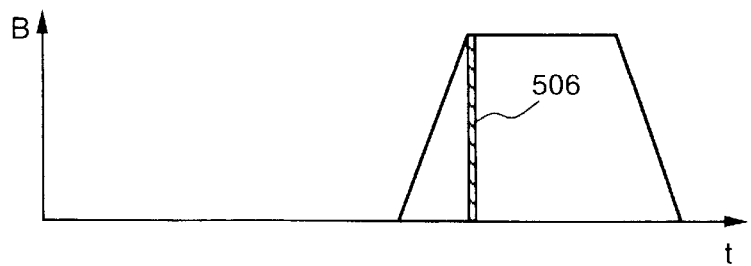

Sheet 6 of 10, Fig.6B, the arrow 502 should be to the right.

Col. 1, lines 26-27, delete "photoreceptors'"" and insert therefor -- shift units --.

Signed and Sealed this

First Day of May, 2001

Attest:

NICHOLAS P. GODICI

Attesting Officer *Acting Director of the United States Patent and Trademark Office*